(12) United States Patent
Rossbach et al.

(10) Patent No.: US 10,960,420 B2
(45) Date of Patent: Mar. 30, 2021

(54) SPRAY HEAD FOR SUPPLYING AT LEAST ONE DIE OF A FORMING MACHINE WITH LUBRICATING COOLANT, AND METHOD FOR PRODUCING SUCH A SPRAY HEAD

(71) Applicant: SMS group GmbH, Duesseldorf (DE)

(72) Inventors: Axel Rossbach, Moenchengladbach (DE); Markus Schaprian, Moenchengladbach (DE); Norbert Gober, Mönchengladbach (DE); Thomas Koch, Moenchengladbach (DE); Olga Plotnikov, Moenchengladbach (DE); Christoph Heinzel, Moenchengladbach (DE)

(73) Assignee: SMS group GmbH, Duesseldorf (DE)

( * ) Notice: Subject to any disclaimer, the term of this patent is extended or adjusted under 35 U.S.C. 154(b) by 174 days.

(21) Appl. No.: 15/744,287

(22) PCT Filed: Jul. 14, 2016

(86) PCT No.: PCT/DE2016/100316
§ 371 (c)(1),
(2) Date: Jan. 12, 2018

(87) PCT Pub. No.: WO2017/012609
PCT Pub. Date: Jan. 26, 2017

(65) Prior Publication Data
US 2018/0200740 A1    Jul. 19, 2018

(30) Foreign Application Priority Data

Jul. 17, 2015   (DE) .................... 10 2015 111 685.5

(51) Int. Cl.
*B05B 7/06*    (2006.01)
*B21D 37/16*   (2006.01)
(Continued)

(52) U.S. Cl.
CPC .............. *B05B 7/066* (2013.01); *B21D 37/16* (2013.01); *B21D 37/18* (2013.01); *B21J 3/00* (2013.01);
(Continued)

(58) Field of Classification Search
CPC ....... B05B 7/04; B05B 7/0416; B05B 7/0441; B21D 37/16; B21D 37/18; B21J 3/00;
(Continued)

(56) References Cited

U.S. PATENT DOCUMENTS 3,559,447 A * 2/1971 Bogart et al. .......... B21D 37/02
72/342.4
4,707,309 A   11/1987 Voss et al.
(Continued)

FOREIGN PATENT DOCUMENTS

CN    1228365 A    9/1999
CN    1502415 A    6/2004
(Continued)

OTHER PUBLICATIONS

German Office Action dated May 23, 2016 in German Application No. 10 2015 114 202.3, with English translation of relevant parts.
(Continued)

*Primary Examiner* — Teresa M Ekiert
*Assistant Examiner* — Sarkis A Aktavoukian
(74) *Attorney, Agent, or Firm* — Collard & Roe, P.C.

(57) ABSTRACT

A spray head for supplying at least one die of a forming machine with lubricating coolant, the forming machine including a lower die and an upper die, is preferably produced by rapid manufacturing and is designed as a single piece to a large extent. The use of rapid manufacturing allows the production of the most varied configurations, such as stabilizing honey-comb structures or drip points, which allow a more advantageous design of the spray head.
(Continued)

The spray head carries at least one two-substance nozzle connected with at least one feed channel. The nozzle body of the nozzle and the channel wall of the feed channel are configured in one piece with one another or the channel wall of the feed channel and a spray head foot carrying a supply connector connected with the feed channel are configured in one piece with one another.

22 Claims, 6 Drawing Sheets

(51) Int. Cl.
| | | |
|---|---|---|
| *B21D 37/18* | (2006.01) | |
| *B21K 29/00* | (2006.01) | |
| *B30B 15/00* | (2006.01) | |
| *B21J 3/00* | (2006.01) | |
| *B29C 37/00* | (2006.01) | |
| *B30B 15/34* | (2006.01) | |

(52) U.S. Cl.
CPC .......... *B21K 29/00* (2013.01); *B30B 15/0088* (2013.01); *B29C 2037/92* (2013.01); *B30B 15/34* (2013.01)

(58) Field of Classification Search
CPC ..... B21K 29/00; B30B 15/0088; B30B 15/34; B33Y 10/00
USPC ............................ 239/408, 410, 416.5, 417.3
See application file for complete search history.

(56) References Cited

U.S. PATENT DOCUMENTS

| | | | |
|---|---|---|---|
| 4,758,142 A | 7/1988 | Voss et al. | |
| 4,798,341 A | 1/1989 | Gimple | |
| 5,524,829 A | 6/1996 | Keim et al. | |
| 5,785,252 A | 7/1998 | Keim et al. | |
| 5,881,797 A | 3/1999 | Hansen | |
| 6,067,721 A | 5/2000 | Dall'Aglio et al. | |
| 6,123,270 A | 9/2000 | Hara | |
| 6,691,932 B1 | 2/2004 | Schultz et al. | |
| 7,017,334 B2* | 3/2006 | Mayer ..................... | F02K 1/822 239/127.3 |
| 8,114,209 B2 | 2/2012 | Aoki et al. | |
| 8,425,214 B2 | 4/2013 | Keim | |
| 8,480,823 B1* | 7/2013 | Matsen .................. | B21D 37/16 148/574 |
| 8,524,312 B2 | 9/2013 | Huda et al. | |
| 8,800,957 B2 | 8/2014 | Saine | |
| 9,364,839 B2 | 6/2016 | Huda et al. | |
| 9,370,792 B2 | 6/2016 | Wesselky et al. | |
| 9,671,039 B2 | 6/2017 | Saine | |
| 10,449,561 B2 | 10/2019 | Xie | |
| 2003/0155450 A1 | 8/2003 | Renkl et al. | |
| 2004/0217212 A1 | 11/2004 | Erhard et al. | |
| 2005/0035226 A1* | 2/2005 | Schebesta ............ | B05B 7/0416 239/551 |
| 2005/0211799 A1* | 9/2005 | Van Steenkiste ..... | B05B 7/1486 239/416.5 |
| 2005/0242209 A1 | 11/2005 | Holm et al. | |
| 2005/0251243 A1* | 11/2005 | Seppala .................. | A61F 2/958 623/1.11 |
| 2007/0007699 A1* | 1/2007 | Rynerson ................ | B22F 3/008 264/497 |
| 2007/0074656 A1 | 4/2007 | Zhao et al. | |
| 2007/0131140 A1* | 6/2007 | Aoki .................. | B22D 17/2007 106/38.22 |
| 2008/0251243 A1* | 10/2008 | Dimter .................... | B22C 9/061 165/170 |
| 2010/0116900 A1 | 5/2010 | Wurz | |
| 2010/0155509 A1 | 6/2010 | Keim | |
| 2012/0036775 A1 | 2/2012 | Sprouse et al. | |
| 2012/0168652 A1 | 7/2012 | Saine | |
| 2013/0052359 A1 | 2/2013 | Ahmadi et al. | |
| 2013/0122199 A1 | 5/2013 | Huda et al. | |
| 2014/0361203 A1 | 12/2014 | Saine | |
| 2017/0291179 A1 | 10/2017 | Xie | |
| 2018/0043388 A1 | 2/2018 | Ahmadi et al. | |

FOREIGN PATENT DOCUMENTS

| | | |
|---|---|---|
| CN | 101730594 A | 6/2010 |
| CN | 101737314 A | 6/2010 |
| CN | 201552087 U | 8/2010 |
| CN | 102513480 A | 6/2012 |
| CN | 102513481 A | 6/2012 |
| CN | 202497968 U | 10/2012 |
| CN | 102883990 A | 1/2013 |
| CN | 102950071 A | 3/2013 |
| CN | 103240374 A | 8/2013 |
| CN | 103930216 A | 7/2014 |
| CN | 104630391 A | 5/2015 |
| CN | 204338367 U | 5/2015 |
| CN | 204338368 U | 5/2015 |
| DE | 25 26 900 A1 | 1/1977 |
| DE | 2622818 A1 | 12/1977 |
| DE | 30 39 914 A1 | 5/1982 |
| DE | 87 12 350 U1 | 11/1987 |
| DE | 36 40 818 C1 | 6/1988 |
| DE | 37 09 666 C1 | 11/1988 |
| DE | 195 11 272 A1 | 10/1996 |
| DE | 196 33 266 A1 | 2/1998 |
| DE | 102005010409 A1 | 9/2006 |
| DE | 10 2006 004 107 B4 | 10/2008 |
| DE | 10 2007 031 263 A1 | 1/2009 |
| DE | 10 2008 047 118 A1 | 4/2010 |
| EP | 0 114 137 A1 | 7/1984 |
| EP | 1 637 252 A1 | 3/2006 |
| FR | 2 115 663 A5 | 7/1972 |
| GB | 1 475 771 A | 6/1977 |
| JP | S59-205970 A | 11/1984 |
| JP | H07-185768 A | 7/1995 |
| JP | H09-225354 A | 9/1997 |
| JP | 2998904 B2 | 1/2000 |
| JP | 2002-321033 A | 11/2002 |
| JP | 2004-261657 A | 9/2004 |
| JP | 2007-504977 A | 3/2007 |
| JP | 2007-185768 A | 7/2007 |
| JP | 2009-225354 A | 10/2009 |
| JP | 2015-033723 A | 2/2015 |
| JP | 2015-505715 A | 2/2015 |
| KR | 20-19950008317 Y1 | 10/1995 |
| KR | 96-0033559 A | 10/1996 |
| KR | 2014-0099906 A | 8/2014 |
| WO | 97/19773 A1 | 6/1997 |
| WO | 2006-025368 A1 | 3/2006 |
| WO | 2013/142045 A1 | 9/2013 |
| WO | 2014/058885 A1 | 4/2014 |

OTHER PUBLICATIONS

Additional Information from the International Office regarding PCT/DE2016/100316 dated Nov. 18, 2016 with an English translation of relevant parts.
English translation of the International Preliminary Report on Patentability in PCT/DE2016/100316 dated Jan. 23, 2018.
International Search Report of PCT/DE2016/100316, dated Apr. 26, 2017.
Korean Office Action in KR Application No. 10-2019-7020189 dated Mar. 25, 2020.
International Search Report in PCT/DE2018/100010, dated Apr. 5, 2018.
German Office Action in DE 10 2017 100 438.6, dated Jul. 19, 2017, with English translation of relevant parts.
International Preliminary Report on Patentability in PCT/DE2018/100010 with English Translation dated Jul. 18, 2019.
Notification of Reason for Refusal dated Nov. 20, 2019 in KR 10-2019-7020189.

(56) References Cited

OTHER PUBLICATIONS

"The Development of Key Manufacturing Industries in the World", 2013, p. 202 (See Dec. 31, 2019 Chinese Office Action for relevance).
Chinese Office Action in Chinese Application No. 201680042126.2 dated Dec. 31, 2019 with English translation.
Second Chinese Office Action dated Oct. 20, 2020 in Chinese Application No. 201680042126.2 with English translation.
Japanese Office Action in JP 2018-502175, dated Jun. 23, 2020.
Japanese Search Report in JP 2018-502175, dated Apr. 21, 2020.

* cited by examiner

SPRAY HEAD FOR SUPPLYING AT LEAST ONE DIE OF A FORMING MACHINE WITH LUBRICATING COOLANT, AND METHOD FOR PRODUCING SUCH A SPRAY HEAD

CROSS REFERENCE TO RELATED APPLICATIONS

This application is the National Stage of PCT/DE2016/100316 filed on Jul. 14, 2016, which claims priority under 35 U.S.C. § 119 of German Application No. 10 2015 111 685.5 filed on Jul. 17, 2015, the disclosures of which are incorporated by reference. The international application under PCT article 21(2) was not published in English.

BACKGROUND OF THE INVENTION

1. Field of the Invention

The invention relates to a spray head for cooling lubrication of at least one die of a forming machine, which machine has a lower die and an upper die, in particular of a die-forging press, which spray head is introduced into a working chamber between the upper die and the lower die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel. Likewise, the invention relates to a method for the production of such a spray head.

2. Description of the Related Art

Such spray heads are known, for example, from DE 10 2006 004 107 B1 or also from DE 195 11 272 A1. In this regard, the spray heads are essentially composed of a multi-layer plate arrangement, by means of which separate feed channels for the spray medium and the spray air, as well as also corresponding valves, in particular membrane valves and feed channels for control fluid, by means of which the membrane valves can be controlled, are made available. The plate-type spray heads do have a relatively narrow construction, so that they can also get into smaller free spaces between the dies. However, the variability of the use of these spray heads is limited.

SUMMARY OF THE INVENTION

It is the task of the present invention to make available spray heads of the stated type, which allow more variable use.

The task of the invention is accomplished by a spray head and by a method for production of a spray head, having the characteristics of the independent claims. Further advantageous embodiments, if applicable also independent of these, are found in the dependent claims and in the following description.

Thus, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, is characterized in that the two-substance nozzle has a nozzle body configured in one piece, and is configured in one piece except for movable modules, such as, for example, possible valve covers or valve membranes.

The nozzle body configured in one piece or the two-substance nozzle configured in one piece allow, in particular, elimination of possible seals and a very compact structure of the two-substance nozzle, which thereby also increases the versatility in use, since the two-substance nozzle has a relatively small construction and nevertheless can be configured so as to be individually controllable.

Also, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that the nozzle body of the two-substance nozzle and a channel wall of the feed channel are configured in one piece with one another.

Such a configuration also allows elimination of possible seals in the connection between the two-substance nozzle and the channel wall of the feed channel, so that here, the arrangement has a correspondingly space-saving construction and therefore individual configuration of the spray head is possible, which in turn allows the latter to be used in versatile manner.

Likewise, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that the channel wall of the feed channel and of the spray head foot are configured in one piece with one another.

This also allows a compact configuration of the spray head, and this accordingly increases its versatility in use.

Accordingly, the single-piece nature of the modules explained above brings about a compact construction, in each instance, which particularly eliminates seals and increases the versatility by means of its compact nature. In particular, it is possible, for example, to provide very many individual nozzles in the spray head, which nozzles can also be individually controlled in the configuration, so that a respective die can be provided with cooling lubrication in very individual manner, wherein—if necessary—correspondingly adapted cooling lubrication can take place in the case of a change in die, by means of different control of the individual spray head nozzles.

In light of this advantage, it is evident that in particular, not only the nozzle body, the channel wall of the feed channel but also the spray head foot can be configured in one piece with one another, and thereby the corresponding advantage shows itself even more greatly.

In this regard, it is understood that possible valve covers or valve membranes or other modules of the two-substance nozzle do not necessarily have to be configured in one piece with the same, but this is certainly conceivable—for example—in the case of membranes that can already be made available by means of locations of the material of the nozzle body that are configured to be correspondingly thin.

Preferably, a housing that is specially provided is also configured in one piece with the nozzle body, the channel wall of the feed channel and/or the spray head foot, and, because the housing can then act to provide supplemental stabilization with regard to the individual modules of the spray head, this also allows the possibility of configuring the individual modules of the spray head to be more compact, resulting in the advantages already mentioned.

Furthermore, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that the two-substance nozzle comprises a DE LAVAL or other convergent-divergent type nozzle.

Particularly intensive atomization of the mixture of spray medium and spray air is guaranteed by means of the configuration as a DE LAVAL or other convergent-divergent type nozzle, and this holds true even in the case of relatively small two-substance nozzles. This yields the result, as has already been explained above, of a particularly preferred possibility of configuring the spray head in very compact manner, and thereby of providing many two-substance nozzles having the individual possibilities of spraying onto a die that are connected with this.

In this regard, it is particularly advantageous if the two-substance nozzle has a spray air outlet that is configured as a DE LAVAL or other convergent-divergent type nozzle. This can be managed in comparatively good manner in terms of flow technology, and can also be implemented easily in structural terms, particularly if the spray air outlet surrounds a spray medium outlet. The spray air, accelerated to extremely high speeds by the DE LAVAL or other convergent-divergent type nozzle can then entrain and atomize spray medium particularly well also due to the strong eddying caused by the DE LAVAL or other convergent-divergent type nozzle. Therefore it is possible to produce an excellent spray profile with particularly small two-substance nozzles, which profile accordingly can be adapted for individualization of the spray profile as a function of the respective die that is supposed to be provided with cooling lubrication.

Furthermore, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that a channel wall of the feed channel is configured as a pipe.

A pipe allows excellent hydrodynamic properties, if a fluid, whether it is a mixture, the spray medium, the spray air or a control fluid, is supposed to be supplied to the two-substance nozzle, so that the corresponding channel can be made available with a minimal cross-section at maximal degrees of effectiveness. In particular, a pipe can also be laid immediately and directly, so that possible sharp bends or the like can be reduced to a minimum. This makes it possible overall to structure the spray head in significantly more compact manner, since little construction space is required for the pipe due to its small cross-section. This in turn allows an increase in the freedom for individual adaptation of the spray head or for accommodation of the greatest possible number of two-substance nozzles in the spray head.

Preferably, the pipe is configured to be inherently rigid and can support itself as well as the two-substance nozzle. In this way, it is essentially possible to eliminate further supporting modules, wherein—if necessary—a supplemental housing can be provided, which can have a supplemental supporting effect, if applicable. Nevertheless, it is advantageous if the pipe can essentially support itself as well as the two-substance nozzle, and the housing has merely a supporting effect here. This brings about the result that the housing can be configured to be relatively light, and this accordingly brings with it a gain in construction space, once again.

It is understood that the two-substance nozzle can be connected with multiple feed channels, which can be configured in accordance with the requirements described above. In this way, it is particularly possible to supply different fluids, such as the control fluid, spray medium and spray air, for example, to the two-substance nozzle through separate feed channels. If necessary, discharge can also be provided in this regard, if, for example, the spray medium is supposed to be circulated in order to counteract possible de-mixing processes. In this regard, it is understood that if multiple feed channels are connected with a two-substance nozzle, it is sufficient if the feed channels are each configured as a pipe and can carry the two-substance nozzle together. Here, ultimately weighing of the mass required for inherent rigidity and of the freedom with regard to the individual configuration possibilities must be undertaken.

If necessary, it is also possible that the spray head carries at least two two-substance nozzles, each connected with at least one feed channel. In particular, a plurality of two-substance nozzles can, of course, be provided, which each are connected with at least one feed channel, wherein it is also conceivable that the two-substance nozzles face in different directions, for example upward and downward, in each instance. Likewise, the two-substance nozzles can, of course, also be provided with angles that are inclined relative to the vertical.

On the other hand, it is also conceivable to supply multiple two-substance nozzles with a fluid, for example with a spray medium or spray air, by way of a common feed channel. This is particularly conceivable if each of the nozzles can be controlled separately, for example by a separate control fluid feed channel, so that the number of feed channels can be restricted to a minimum, which accordingly again makes construction space available.

Free space can be provided between the two-substance nozzles and the feed channels, which reduces the total weight, on the one hand, so that the spray head can be brought into the working chamber more quickly and also removed from it again. Furthermore, the free space allows that possible liquid components that fly around in the working chamber and deposit on the spray head or threaten to deposit on it pass through the free space and can flow down on the walls that surround the free space. In this way, it can be avoided that liquids accumulate on the top side of the spray head, which could possible lead to uncontrolled effects on the forming machine, for example if these are then slung away again.

In this regard, the undersides of the respective modules of the spray head that surround the free space form drip points, by their nature, at which any liquid that is present can drip off. In the case of suitable configuration of the spray head, it can be guaranteed that a plurality of such drip points is present, so that large accumulations of liquid, which could lead to deposits of the spray medium on the die or also on workpieces that are supposed to be processed in the forming machine can be prevented.

These effects can be observed, in particular, in the plate-type spray heads that are known from the state of the art, in which uncontrolled distribution and deposition of fluids, in particular of spray medium or water, come about due to large accumulations of fluid at the spray head.

Accordingly, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that the spray head has a top side and an underside, and that drip points are provided on the underside, in at least one region next to the two-substance nozzle.

In the vicinity of the two-substance nozzle, the problem of accumulation of liquid will not often occur due to the nozzle effect, particularly if DE LAVAL or other convergent-divergent type nozzles, for example, are used. In regions next to the two-substance nozzle, however, this can occur at level locations. By means of drip points, such as those made available by suitably configured projections or the underside of pipes and the like, by their nature, for example, a plurality of small droplets can accumulate over the underside of the spray head, in each instance, and drip off without accumulating to form large drops. Such small droplets can be tolerated in the normal process sequence, as such.

It is particularly conceivable to provide such drip points by means of defined projections or edges on the underside of the spray head that are made available. This can be, in particular, the edges of pores or honeycombs that open up, for example.

Preferably, drip flow openings reach from the top side to the underside through the spray head, by means of which openings liquid gets from the top side to the underside. In this way, larger amounts of fluid that accumulate on the top side of the spray head can be prevented, and this brings advantages with it, accordingly. In this regard, it is understood that such drip flow openings, if applicable, can also be advantageous independent of the other characteristics of the present invention, in the case of a spray head of the stated type.

Preferably, the drip flow openings end at drip points, so that not only targeted guidance of the liquid from the top side to the underside but also targeted dripping is guaranteed.

Also, a spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be characterized in that the spray head has a porous housing.

Aside from the fact that the porosity as such is accompanied by weight savings, making the spray head lighter and therefore able to move more easily and more quickly, so that it can be used in more versatile manner, the porous housing, by its nature, allows drip points and—depending on the specific embodiment of the porosity—also drip flow openings to be present. In this regard, it is advantageous if the spray head has a top side and an underside, and the pores of the housing open at the top side and/or at the underside.

Pores can be made available, in simple manner, in terms of construction, if these are disposed regularly, since regular arrangements are easier to prepare and provide in terms of mechanical engineering.

As has already been explained above, it is advantageous if the pores reach from the top side to the underside, at least in part, wherein the drip flow openings formed in this way can penetrate through the housing in a straight line or by irregular paths, depending on the specific implementation; ultimately, this is determined by the specific embodiment of the pores. In particular, it is also conceivable, for example, that the housing merely has thin walls with corresponding holes or pores, and is hollow toward the inside, so that liquid can easily penetrate through the interior of the housing.

In particular, the pores can comprise honeycombs, since honeycombs are known to be extremely stable with particularly low use of material and weight, and nevertheless are open so that they can serve as drip flow openings, if they reach from the top side to the underside of the housing. On the other hand, the edges of the honeycombs can form drip points very well if they are regularly distributed over the underside of the housing.

As has already been explained above, it is advantageous if at least one of the pores penetrates from the top side all the way to the underside, so that in this way, a drip flow opening is made available. Preferably, at least some of the pores penetrate the housing from the top side to the underside, wherein the corresponding number of pores depends on the extent by which fluid is supposed to be conducted from the top side of the housing to the underside. In this regard, it is understood that—if, for example, honeycombs reach from the top side to the underside, but these honeycombs border on internal structures, such as pipes or nozzle bodies, for example—small openings can be provided between the honeycombs and the internal structures, if necessary, in order to guarantee reliable through-flow of liquid.

It is understood that the pores or honeycombs can easily be configured as housing components, also in one piece with the feed channels or their walls, the nozzle bodies, or also the spray head foot.

A spray head for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, and is characterized in that the spray head carries at least one mist nozzle supplemental to the two-substance nozzle, can be used in particularly versatile manner, particularly also at high temperatures, since additional cooling of the spray head can be achieved by way of these mist nozzles, something that is advantageous, in particular, during maintenance phases or in the case of breakdowns, for example, so that the spray head does not overheat. This also makes it possible, in particular, to use materials for the spray head that are somewhat less thermally stable, and accordingly, this allows the spray head to be used in more versatile manner. In particular, such materials, in other words materials that are somewhat less thermally stable, can be worked more easily and in more delicate manner, so that in total, a spray head that can be used in more flexible manner can also be produced.

Any type of nozzle that is suitable for supplementally dispensing a coolant and nebulizing, atomizing or evaporating it, in order to cool the spray head itself in this manner, can be used as a mist nozzle.

Preferably, the mist nozzle is directed at modules of the spray head or upward, so that corresponding cooling of the spray head is guaranteed. The latter takes place, for example, in that a liquid that comes from the mist nozzle and is dispensed upward drops back onto the spray head under the effect of gravity and thereby cools it.

In particular, however, it is advantageous if the mist nozzle is directed at a nozzle body of the two-substance nozzle, at a channel wall of the feed channel, at the spray head foot and/or at the housing, because in this way, particularly suitable cooling can be guaranteed. In particular, of course, a corresponding mist nozzle can also become effective in the interior of the housing; this is particularly non-critical in interplay with the drip flow openings and the drip points, since no liquid can then accumulate in the interior of the housing.

Preferably, the mist nozzle nebulizes water, which is generally particularly non-critical in terms of process management and provides excellent cooling.

A spray head that can be used in particularly versatile manner for cooling lubrication of at least one die of a forming machine that has a lower die and an upper die, particularly of a die-forging press, which spray head is introduced into a working chamber between the lower die and the upper die between two working strokes, and carries at least one two-substance nozzle, which atomizes a mixture of spray medium and spray air onto the die for cooling lubrication, and is connected with at least one feed channel, by way of which a control fluid, the mixture, spray medium or spray air can be supplied to the two-substance nozzle, and which reaches all the way to a spray head foot, which carries a supply connector, which is connected with the feed channel, can be produced if the production process is characterized in that modules of the spray head, such as a nozzle body of the two-substance nozzle, for example, a channel wall of the feed channel or the spray head foot or a housing are produced by means of 3D printing.

This production method makes it possible to make one-piece or monolithic modules available in particularly simple manner, in terms of construction, which modules are furthermore extremely delicate and individually adapted. This holds true, in particular, for example, for the configuration of a nozzle body as a DE LAVAL or other convergent-divergent type nozzle, for example, or also for very tight and intertwined guidance of feed channels or of pipes that form these feed channels. In this regard, flow-technology optimizations, in particular, can be implemented in simple and goal-oriented manner, wherein—in view of the relatively small numbers at which such spray heads need to be made available for forming machines—3D printing is relatively cost-advantageous, particularly also due to its very great individualization.

Preferably, this 3D printing prints metallically, so that spray heads that are relatively stable thermally can be produced in this manner. Due to the measures described above, particularly due to the cooling, however, metals that are relatively heat-sensitive can also be used, and this brings with it corresponding advantages or facilitations during production, since correspondingly high temperatures do not need to be made available for production.

It is understood that if necessary, 3D printing can also print plastics, if these plastics are sufficiently thermally stable or if sufficient cooling is present, in particular for the case of breakdowns or during maintenance work.

It is understood that the characteristics of the solutions described above and in the claims can also be combined, if applicable, in order to be able to implement the advantages cumulatively, accordingly.

BRIEF DESCRIPTION OF THE DRAWINGS

Further advantages, goals, and properties of the present invention will be explained using the following description of exemplary embodiments, which are shown, in particular, in the attached drawing, as well. The drawing shows.

DETAILED DESCRIPTION OF THE PREFERRED EMBODIMENTS

Figure 1:
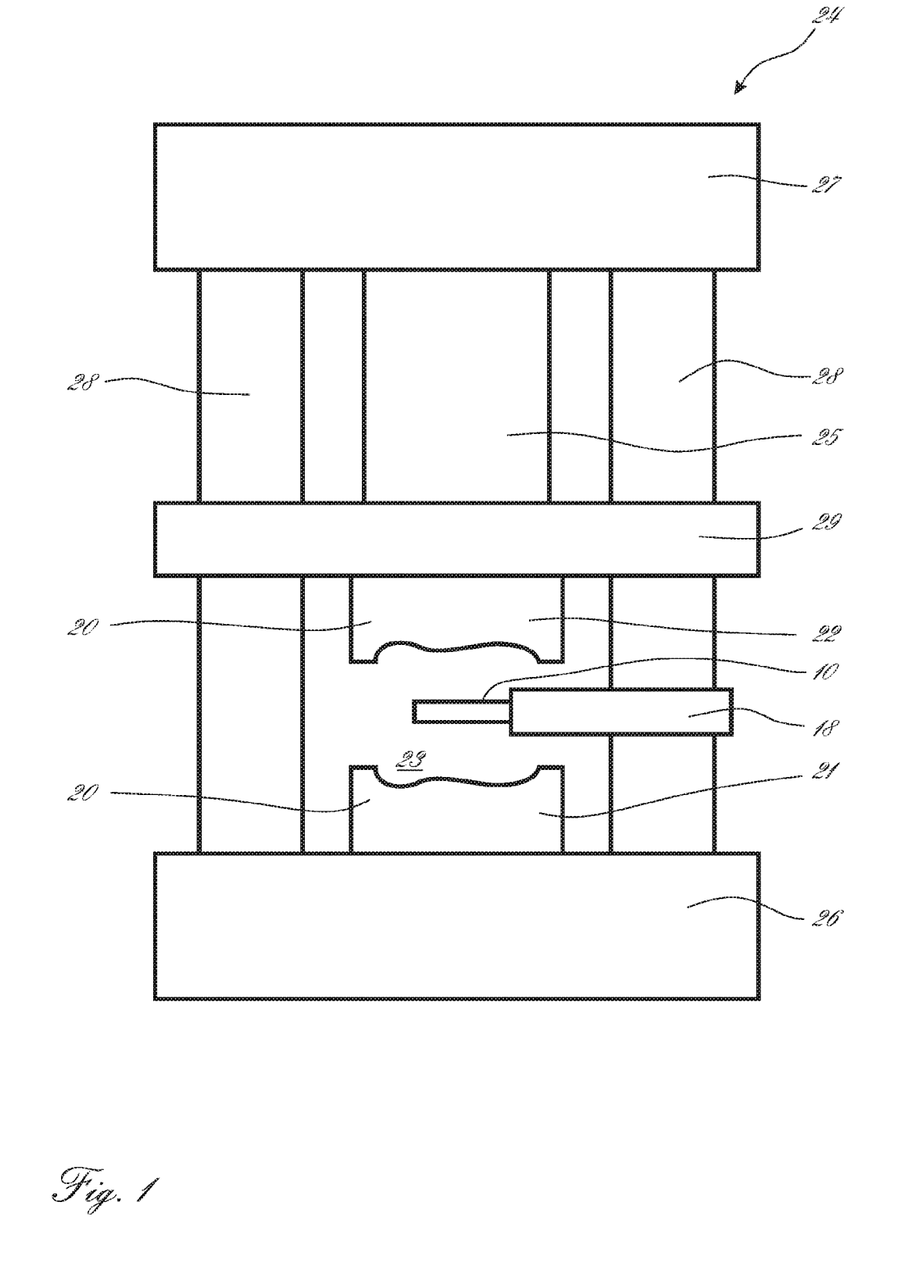
FIG. 1 a schematic side view of a forming machine configured as a die-forging press, having a spray head situated on a spray arm.
Figure 2:
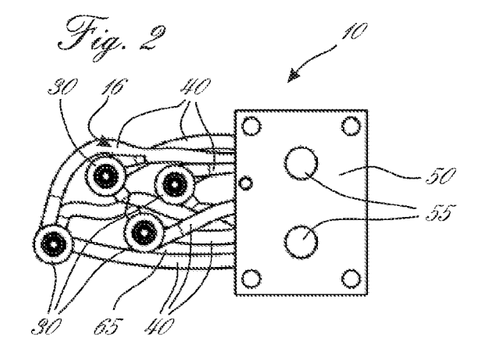
FIG. 2 the spray head according to FIG. 1 in a schematic view from below.
Figure 3:
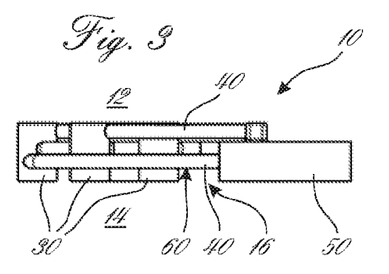
FIG. 3 the spray head according to FIGS. 1 and 2 in a side view.
Figure 4:
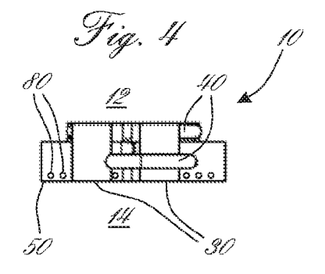
FIG. 4 the spray head according to FIGS. 1 to 3 in a view from the front.
Figure 5:
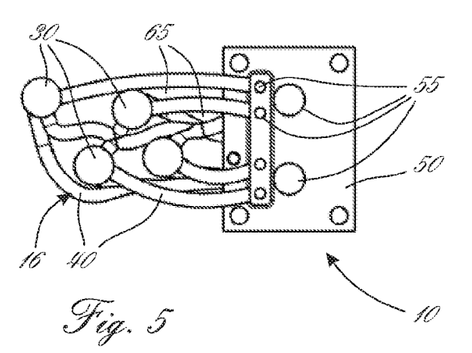
FIG. 5 the spray head according to FIGS. 1 to 4 in a top view.
Figure 6:
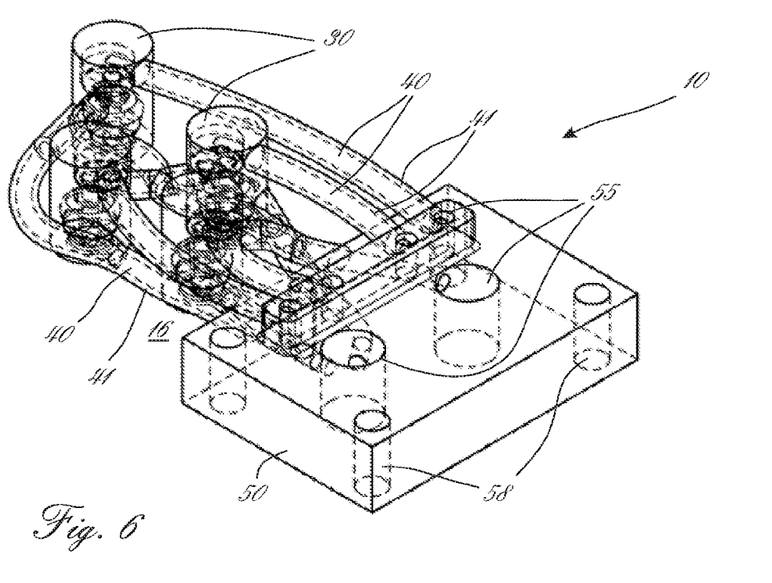
FIG. 6 the spray head according to FIGS. 1 to 5 in a perspective, partially transparent view.

The forming machine 24 shown schematically in FIG. 1 is structured as a die-forging press and comprises two dies 20, a lower die 21 and an upper die 22, which can be moved toward one another and away from one another by means of a press cylinder 25.

For this purpose, the forming machine comprises a lower yoke 26 and an upper yoke 27, which are spaced apart from one another by way of tension rods 28, wherein the tension rods 28 can counteract the pressing forces that the press cylinder 25 applies.

A movable yoke 29 is guided on the tension rods 28, which yoke can be moved accordingly by the press cylinder for pressing, and on which the upper die 22 is attached, so that the upper die 22 can be lowered onto the lower die 21, which is disposed on the lower yoke 26, with every working stroke.

As is directly evident, a working chamber 23 then occurs between the lower and upper die 21, 22 between two working strokes.

Depending on the specific embodiment, the tool must be lubricated and/or blown out, in particular if workpieces are produced in constantly repeating manner, in order to guarantee proper functioning. This also holds true for the dies 20.

For this purpose, the forming machine comprises a spray head 10, which can be introduced into the working chamber 23 by way of a spray arm 18.

Figure 7:
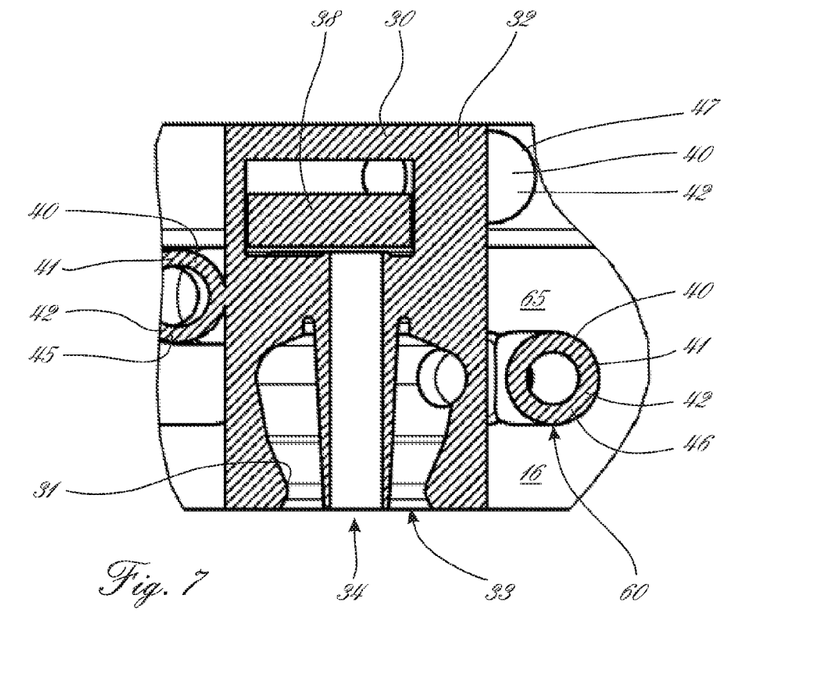
FIG. 7 a schematic sectional representation through a two-substance nozzle according to FIGS. 1 to 6.

As can be seen in FIGS. 2 to 7, the spray head has multiple two-substance nozzles 30, which—in this exemplary embodiment—comprise a DE LAVAL or other convergent-divergent type nozzle 31, as is particularly shown in FIG. 7. It is understood that depending on the specific requirements, other types of nozzles can also be provided in deviating embodiments.

Each of these two-substance nozzles 30 is connected with a spray head foot 50 by way of three feed channels 40 in this exemplary embodiment, which foot has supply connectors 55, which in turn are connected with the feed channels 40 and can supply these with a control fluid, with spray medium or with spray air.

Thus, each feed channel 40 has a channel wall 41, which is configured as a pipe 42 in this exemplary embodiment, wherein other pipe cross-sections or channel cross-sections can be selected in other embodiments. It is understood that pipes that lie close to one another, in particular, can also be structured in one piece or with a common wall.

As can be seen, in particular, in FIG. 7, the two-substance nozzle 30 is directly connected with a spray medium channel 45, a spray air channel 46, and a control channel 47 as feed channels 40, which also carry the corresponding two-substance nozzle 30 in this exemplary embodiment. In a deviating exemplary embodiment, a spray medium discharge channel, for example, can also be provided, so that the spray medium can be moved past the two-substance nozzle 30 in circulation, in order to prevent de-mixing processes and nevertheless make the spray medium available to the two-substance nozzle 30 by way of the spray medium channel 45.

The two-substance nozzle 30 itself comprises a nozzle body 32, which has a spray air outlet 33, on the one hand, and a spray medium outlet 34, on the other hand. In this regard, the spray air outlet 33 is configured as a DE LAVAL or other convergent-divergent type nozzle 31, so that the extremely high speeds of spray air can be achieved and atomize the spray medium in particularly fine manner, due to the extreme eddying caused by the DE LAVAL or other convergent-divergent type nozzle 31.

The two-substance nozzles 30 of the present exemplary embodiment each have a valve cover 38, which, as can be seen in FIG. 7, closes off the spray medium outlet 34 when control fluid (in this exemplary embodiment, compressed air is particularly suitable for this) is made available at sufficient pressure by way of the control channel 47. When stress on the valve cover 38 is relieved, the spray medium from the spray medium channel 45 lifts the valve cover 38 against the pressure that prevails in the control channel 47, so that the valve cover 38 opens and spray medium can leave the two-substance nozzle through the spray medium outlet 34.

In this manner, extremely individual metering of spray medium and of spray air can take place, since every two-substance nozzle 30 can be controlled individually, and this can be implemented, in particular, by way of the control channels 47 and the separate spray air channels 46.

In this exemplary embodiment, the spray medium channels 45 are brought together, since ultimately, it does not play any role whether the corresponding feed channels 40 are present individually or as a channel tree. Corresponding individual control is possible by means of the valve covers 38.

As is directly evident using the design that can be seen in FIG. 7, the corresponding two-substance nozzle 30 can be directed both downward and upward. Likewise, other angles of inclination are easily possible. Accordingly, the spray profile of the spray head 10 can be selected in very individual manner, wherein this is further reinforced by the individual controllability of the two-substance nozzles 30.

The spray head foot 50 furthermore has bores 58, by means of which it can be held by the spray arm 18 or attached to the spray arm 18.

The spray head 10 has a top side 12 and an underside 14, wherein all the two-substance nozzles 30 are directed downward in the present exemplary embodiment. It is understood that in this regard, as has already been explained above, great freedom exists and one or more, if applicable even all the two-substance nozzles 30 can be directed upward or even to the side.

Due to the very open design of the spray head 10, drip flow openings 65 form in regions 16 next to the two-substance nozzles 30, through which openings any liquids easily get from the top side 12 to the underside 14 of the spray head 10.

Furthermore, drip points 60 form on the undersides of the channel walls 41 or of the feed channels 40, where any liquids can collect in targeted manner and drip off. This has the great advantage, in particular, that accumulation of very large drops, as can occur on undersides of planar surfaces, is prevented to the greatest possible extent.

Furthermore, mist nozzles 80 (see FIG. 4) are disposed on the spray head foot 50, which nozzles can spray the feed channels 40 and the two-substance nozzles 30 with a water mist, which serves for cooling purposes, particularly in the case of breakdowns, wherein corresponding cooling can also be provided during normal operation, if necessary.

As can be readily understood, it is possible to connect the respective pipes 42 with corresponding openings in the nozzle bodies 32, in order to subsequently insert the pipes 42 into the spray head foot 50 and to also connect it there, so that the spray head 10 can easily be made available in conventional manner.

Depending on the specific manner of this connection, seals might have to be provided at the connection points, but this can be avoided if these connections can be configured to be sealed right from the start, for example by means of welding or soldering. The latter is only possible if the operating temperatures can be kept sufficiently low, even in the case of breakdowns, and the mist nozzles 80 can serve for this purpose, if necessary.

Particularly preferably, however, the two-substance nozzles 30, the feed channels 40, and the spray head foot 50 are configured in one piece and produced by means of 3D printing. This 3D printing preferably prints a metal, which can generally withstand the great stresses that act on the spray head 10 in the forming machine 24, not just in a thermal respect, better than other materials. If necessary, however, plastic can also be used, for example, particularly if the temperatures can be kept low enough, and for this purpose, suitable cooling can also take place, for example by means of the mist nozzles 80.

Figure 8:
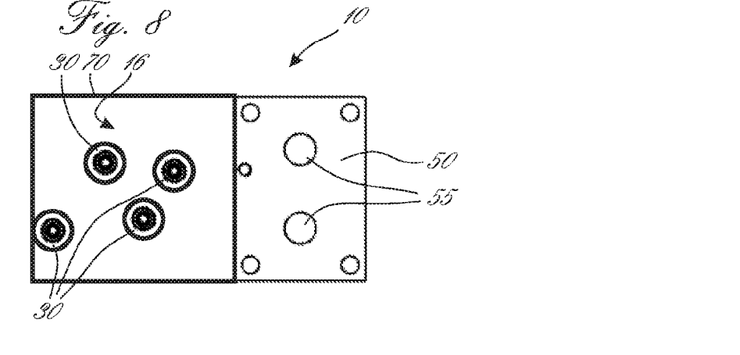
FIG. 8 a second spray head in a similar representation as in FIG. 2.
Figure 9:
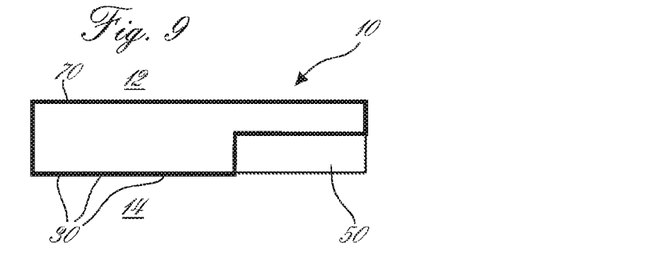
FIG. 9 the spray head according to FIG. 8 in a similar representation as in FIG. 3.
Figure 10:
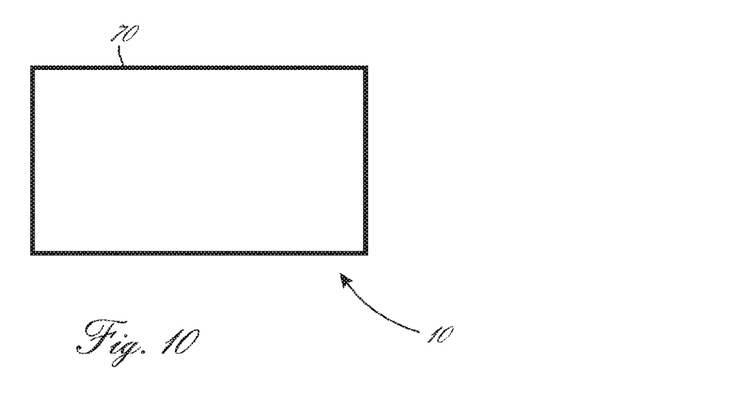
FIG. 10 the spray head according to FIGS. 8 and 9 in a similar representation as in FIG. 5.

As is directly evident, the spray head 10 can easily be structured in such a manner that the feed channels 40 carry the two-substance nozzles 30. The stability of the overall arrangement can be increased if a housing 70 is supplementally provided, which can act in stabilizing manner and as it is shown in FIGS. 8 to 10, as an example.

Such a smooth housing 70 then has the disadvantage that greater accumulations of liquid can possibly form on the top side 12, but also on the underside 14, which is then accepted in such embodiments. On the other hand, the interior of the housing 70 can be protected against impairments by the nature of such an embodiment.

Figure 11:
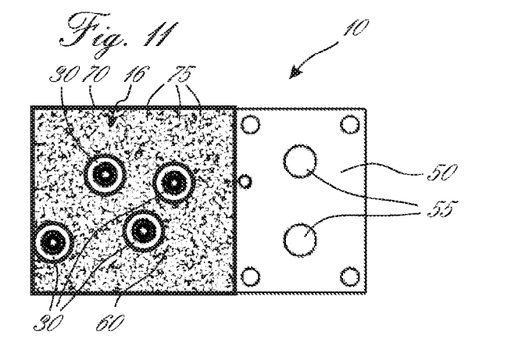
FIG. 11 a third spray head in a similar representation as in FIGS. 2 and 8.
Figure 12:
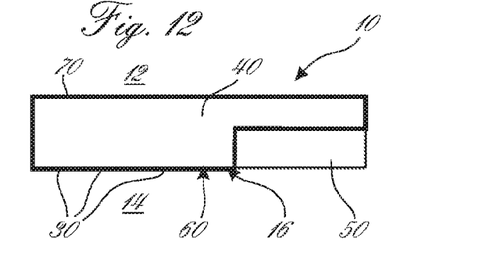
FIG. 12 the spray head according to FIG. 11 in a similar representation as in FIGS. 3 and 9.
Figure 13:
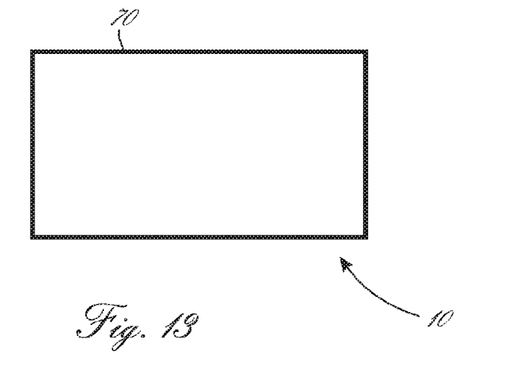
FIG. 13 the spray head according to FIGS. 11 and 12 in a similar representation as in FIGS. 5 and 10.

In order to prevent droplet accumulations on the underside of the housing 70, the latter can be configured to be porous, as is shown in FIGS. 11 to 13, as an example. In the exemplary embodiments shown in FIGS. 11 to 13, only the underside of the housing 70 has pores 75, but these do not penetrate through the housing wall of the housing 70.

The pore edges form drip points 60 in this regard, so that larger accumulations of liquid on the underside 14 of the spray head 10 can be effectively prevented.

In an embodiment that is configured differently, the pores 75 can also penetrate the wall of the housing 70, so that ultimately, holes in the housing wall are made available by the pores 75.

Any liquids that are present can leave the interior of the housing 70 through these holes, and this is particularly advantageous if mist nozzles are also provided in such a spray head 10, which nozzles are directed into the interior of the housing 70.

Likewise, it is understood that the top side of the housing 70 can also have pores, which preferably also penetrate the housing wall, so that due to the upper pores and the lower pores 75, drip flow openings 65 are formed, through which liquid can get from the top side 12 of the spray head 10 to the underside 14 of the spray head 10 and thereby to the drip points 60 formed by the pore edges.

The pores 75 can be arranged in regular or irregular manner, in this regard, and this can be due to the respective requirements or the respective production method.

In particular, the pores 75 can also be configured as honeycombs 76, which preferably penetrate through the entire housing. This brings about great stability of the overall arrangement, since such honeycombs are very stable by their nature. Furthermore, the honeycombs 76 also directly form drip flow openings 65, and drip points 60 at their lower edges, wherein if necessary, small openings or interruptions can be provided at contact locations of the honeycombs 76 with internal structures of the spray head 10, for example with the two-substance nozzles 30 or with the feed channels 40, so that liquid can continue to flow downward through the honeycombs.

Figure 14:
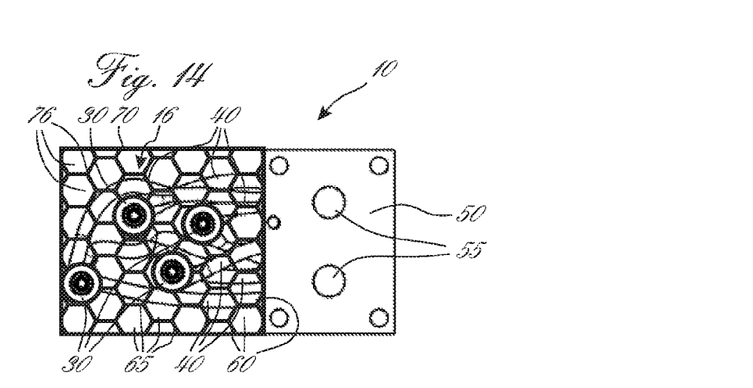
FIG. 14 a fourth spray head in a similar representation as in FIGS. 2, 8, and 11.
Figure 15:
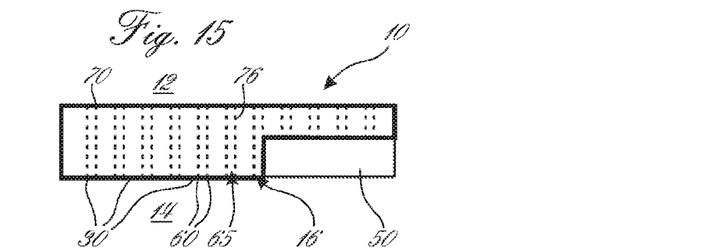
FIG. 15 the spray head according to FIG. 14 in a similar representation as in FIGS. 3, 9, and 12.
Figure 16:
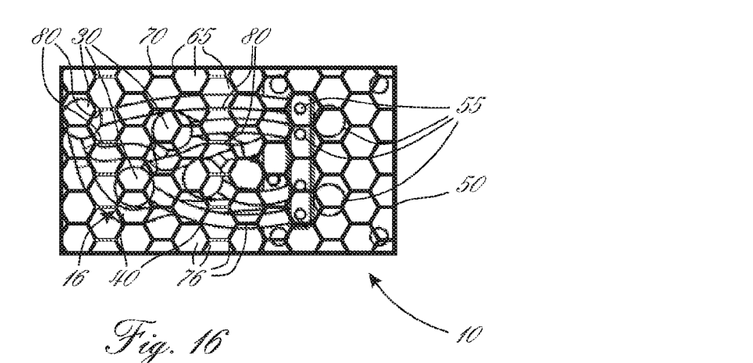
FIG. 16 the spray head according to FIGS. 14 and 15 in a similar representation as in FIGS. 5, 10, and 13.

In the exemplary embodiment shown in FIGS. 14 to 16, as a corresponding example, the honeycombs 76 are selected to be so thick that small channels can be provided in the interior, through which water can be guided to mist nozzles 80, which can be found at the top edges of selected honeycombs and by means of which water can be nebulized for cooling of the overall arrangement. In this regard, the mist nozzles are directed upward and to the side in this exemplary embodiment, wherein here, other orientations are also easily conceivable.

It is understood that the exemplary embodiments shown in FIGS. 8 to 16 can also be produced by way of a 3D printing method.

REFERENCE SYMBOL LIST 10 spray head
12 top side
14 underside
16 region
18 spray arm
20 die
21 lower die
22 upper die
23 working chamber
24 forming machine
25 press cylinder
26 lower yoke
27 upper yoke
28 tension rod
29 movable yoke
30 two-substance nozzle
31 DE LAVAL or other convergent-divergent type nozzle
32 nozzle body
33 spray air outlet
34 spray medium outlet
38 valve cover
40 feed channel
41 channel wall
42 pipe
45 spray medium channel
46 spray air channel
47 control channel
50 spray head foot
55 supply connector
58 bore
60 drip point
65 drip flow opening
70 housing
75 pore 76 honeycomb
80 mist nozzle

The invention claimed is:

1. A spray head for cooling lubrication of at least one of an upper die and a lower die of a forming machine, wherein the spray head is introduced into a working chamber between the upper die and the lower die between two working strokes, the spray head comprising:
   a plurality of feed channels comprising a first feed channel configured to supply a control fluid, a second feed channel configured to supply a spray medium, and a third feed channel configured to supply spray air, each feed channel comprising a channel wall;
   a spray head foot comprising a supply connector; and
   at least one two-substance nozzle connected with the first, second, and third feed channels, the at least one two-substance nozzle being controllable by way of the first feed channel and atomizing a mixture of the spray medium and the spray air onto the upper die or the lower die for cooling lubrication,
   wherein the first, second, and third feed channels extend to the spray head foot,
   wherein the supply connector is connected with the first, second, and third feed channels,
   wherein the at least one two-substance nozzle has a one-piece nozzle body and movable modules,
   wherein the nozzle body of the at least one two-substance nozzle is integral with the channel walls of the feed channels, and/or
   wherein the channel walls of the feed channels are integral with the spray head foot.

2. The spray head according to claim 1, wherein the nozzle body is integral with the channel walls of the feed channels and the spray head foot.

3. The spray head according to claim 1, further comprising a one-piece housing comprising the nozzle body, the channel walls of the feed channels and/or the spray head foot.

4. The spray head according to claim 1, wherein the at least one two-substance nozzle comprises a convergent-divergent nozzle.

5. The spray head according to claim 4, wherein the at least one two-substance nozzle has a spray air outlet, which is configured as the convergent-divergent nozzle.

6. The spray head according to claim 1, wherein each of the channel walls of the feed channels is configured as a pipe.

7. The spray head according to claim 6, wherein the pipe is rigid and supports the at least one two-substance nozzle.

8. The spray head according to claim 1, wherein the spray head has a top side and an underside, and wherein drip points are provided on the underside in at least one region next to the at least one two-substance nozzle.

9. The spray head according to claim 8, further comprising drip flow openings comprising edges forming the drip points, wherein the drip flow openings reach through the spray head from the top side to the underside.

10. The spray head according to claim 9, wherein the drip flow openings end at the drip points.

11. The spray head according to claim 1, wherein the spray head has a porous housing.

12. The spray head according to claim 11, wherein the spray head has a top side and an underside, and the pores of the housing open at the top side and/or at the underside.

13. The spray head according to claim 12, wherein the pores are arranged in a selected pattern.

14. The spray head according to claim 12, wherein the pores are arranged in a honeycomb pattern.

15. The spray head according to claim 12, wherein at least one of the pores penetrates the housing from the top side to the underside.

16. The spray head according to claim 11, wherein the spray head comprises at least one mist nozzle, supplemental to the at least one two-substance nozzle.

17. The spray head according to claim 16, wherein the at least one mist nozzle is directed at the nozzle body of the at least one two-substance nozzle, at the channel walls of the feed channels, at the spray head foot and/or at the housing, or upward.

18. The spray head according to claim 16, wherein the at least one mist nozzle nebulizes water.

19. The spray head according to claim 1, wherein the at least one two-substance nozzle has a spray medium outlet and a valve cover closing off the spray medium outlet when the control fluid is made available at a pressure by way of the first feed channel sufficient to close off the second feed channel via the valve cover.

20. The spray head according to claim 19, wherein when stress on the valve cover is relieved, the spray medium from the second feed channel lifts the valve cover against prevailing pressure in the first feed channel so that the valve cover opens to allow spray medium to leave the at least one two-substance nozzle through the spray medium outlet.

21. A production method for production of a spray head for cooling lubrication of at least one of an upper die and a lower die of a forming machine, the production method comprising:
   producing modules by additive manufacturing processes, wherein the modules comprise a nozzle body of a two-substance nozzle, channel walls of a plurality of feed channels comprising a first feed channel configured to supply a control fluid, a second feed channel configured to supply a spray medium, and a third feed channel configured to supply spray air, and a spray head foot comprising a supply connector;
   forming the spray head from the modules; and
   introducing the spray head into a working chamber between the upper die and the lower die between two working strokes;
   wherein the two-substance nozzle atomizes a mixture of the spray medium and the spray air onto the upper die or the lower die for cooling lubrication;
   wherein the two-substance nozzle is connected with the first, second, and third feed channels, the at least one two-substance nozzle being controllable by way of the first feed channel;
   wherein the first, second, and third feed channels extend to the spray head foot;
   wherein the supply connector is connected with the first, second, and third feed channels; and
   wherein the nozzle body is produced integral with the channel walls of the feed channels and/or wherein the channel walls of the feed channels are produced integral with the spray head foot.

22. The production method according to claim 21, wherein the modules produced by the additive manufacturing processes are metal.

* * * * *